(12) United States Patent
Kim

(10) Patent No.: US 9,247,298 B2
(45) Date of Patent: Jan. 26, 2016

(54) TELEVISION SCREEN CONTROL APPARATUS AND SYSTEM INCLUDING THE SAME

(75) Inventor: Jong Ryul Kim, Seoul (KR)

(73) Assignee: ZAPPLE INC., Seoul (KR)

( * ) Notice: Subject to any disclaimer, the term of this patent is extended or adjusted under 35 U.S.C. 154(b) by 0 days.

(21) Appl. No.: 13/825,781

(22) PCT Filed: May 31, 2012

(86) PCT No.: PCT/KR2012/004321
§ 371 (c)(1),
(2), (4) Date: Mar. 22, 2013

(87) PCT Pub. No.: WO2013/180325
PCT Pub. Date: Dec. 5, 2013

(65) Prior Publication Data
US 2015/0089538 A1    Mar. 26, 2015

(51) Int. Cl.
| | |
|---|---|
| *H04N 21/2387* | (2011.01) |
| *H04N 21/24* | (2011.01) |
| *H04N 21/422* | (2011.01) |
| *H04N 21/431* | (2011.01) |
| *H04N 21/6587* | (2011.01) |
| *H04N 21/458* | (2011.01) |
| *H04N 21/438* | (2011.01) |
| *H04N 21/81* | (2011.01) |
| *H04N 21/84* | (2011.01) |
| *H04N 21/239* | (2011.01) |
| *H04N 21/433* | (2011.01) |

(52) U.S. Cl.
CPC ......... *H04N 21/458* (2013.01); *H04N 21/2393* (2013.01); *H04N 21/431* (2013.01); *H04N 21/4316* (2013.01); *H04N 21/4331* (2013.01); *H04N 21/4383* (2013.01); *H04N 21/812* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 2005/0144637 A1* | 6/2005 | Shikata | G06F 3/0482 725/35 |
| 2005/0283797 A1* | 12/2005 | Eldering | G06Q 30/02 725/35 |
| 2006/0010476 A1 | 1/2006 | Kelly et al. | |
| 2007/0188665 A1 | 8/2007 | Watson et al. | |
| 2008/0027813 A1* | 1/2008 | Kogure et al. | 705/14 |
| 2009/0147140 A1* | 6/2009 | Kim | H04N 5/45 348/565 |
| 2009/0239514 A1* | 9/2009 | Kenagy | H04H 20/106 455/414.3 |
| 2011/0088061 A1 | 4/2011 | Rowe | |

(Continued)

FOREIGN PATENT DOCUMENTS

| | | |
|---|---|---|
| EP | 0 712 242 A2 | 5/1996 |
| EP | 1 657 918 A1 | 5/2006 |

(Continued)

OTHER PUBLICATIONS

Extended European Search Report for EP Application No. 12877873.5 dated May 4, 2015.

*Primary Examiner* — Brian T Pendleton
*Assistant Examiner* — Jean D Saint Cyr

(57) ABSTRACT

A television screen control apparatus includes a broadcasting contents data processing unit receiving broadcasting content for a new channel in response to an channel changing input signal. When broadcasting content is not displayed during a channel transition period, advertising information on a background plane is visible to a viewer.

14 Claims, 11 Drawing Sheets

(56) References Cited

U.S. PATENT DOCUMENTS

| | | | |
|---|---|---|---|
| 2012/0169729 A1* | 7/2012 | Yamaji | H04N 13/0456 345/419 |
| 2012/0233637 A1* | 9/2012 | Henniges | G06Q 30/02 725/32 |
| 2012/0316965 A1* | 12/2012 | Mathews et al. | 705/14.61 |

FOREIGN PATENT DOCUMENTS

| | | |
|---|---|---|
| EP | 2 237 549 A1 | 6/2010 |
| KR | 10-2003-0061887 A | 7/2003 |
| WO | WO 2008/016213 A1 | 2/2008 |
| WO | WO 2010/093189 A2 | 8/2010 |

* cited by examiner

| BROADCASTING CHANNEL | CHANNEL ZAPPING ADVERTISEMENT |
|---|---|
| SBS | H MOTOR GROUP |
| KBS1 | S MOBILE PHONE |
| KBS2 | H SEMICONDUCTOR |
| MBC | L MOBILE OPERATING COMPANY |
| GS HOME SHOPPING | D BEVERAGE |
| ⋮ | ⋮ |
| tvN | BOOK OF M PUBLISHING COMPANY |

Fig.8A

| BROADCASTING CHANNEL | TIME ZONE PERIOD | CHANNEL ZAPPING ADVERTISEMENT |
|---|---|---|
| SBS | 08:01~09:00 | H FRYING PAN |
| | ⋮ | ⋮ |
| | 22:01~24:00 | C ALCOHOLIC LIQUORS |
| KBS1 | 07:01~13:00 | S CLOTHING |
| | 13:01~16:00 | N SNACK |
| | ⋮ | ⋮ |
| KBS2 | 06:01~19:00 | T GOLF SNACK |
| | 19:01~24:00 | S FILMMAKER |
| | ⋮ | ⋮ |

Fig.8B

TELEVISION SCREEN CONTROL APPARATUS AND SYSTEM INCLUDING THE SAME

TECHNICAL FIELD

The present invention relates to a television screen control apparatus and a system including the same, and more particularly, to a television screen control apparatus providing an advertisement screen for a channel changing time, and a system including the same.

BACKGROUND ART

A digital television receives broadcasting contents in a moving picture experts group (MPEG) format to display an image. The MPEG format includes an intra frame (i-frame), a predict frame (p-frame), and a bidirectional frame (b-frame) since a large amount of information is compressed and provided. Among them, the i-frame to which a method of compressing a still image is applied becomes a reference frame of a continuous screen.

Therefore, since the i-frame is a key-frame of specific image data, when a viewer viewing the television changes a channel, information of the changed channel that is new channel is not displayed on the television until an i-frame for the new channel is transmitted. A time between a point in time in which the viewer inputs channel changing instructions to a point in time in which a display screen displays the contents of the new channel is called a channel changing time or a channel zapping time. Research has been attempted in order to decrease the channel changing time. However, currently, it has been known that a channel zapping time of about several seconds is required.

DISCLOSURE

Technical Problem

Accordingly, the present invention has been made to solve the above-mentioned problems occurring in the prior art while advantages achieved by the prior art are maintained.

One object that may be achieved by embodiments of the present invention is a television screen control apparatus capable of allowing an advertisement screen to be exposed for a channel zapping time in which a broadcasting screen on a plane positioned at an upper layer of a background plane is not present by providing an advertisement screen to the lowermost plane, that is, the background plane, of a digital television, and a system including the same.

Another object that may be achieved by embodiments of the present invention is a television screen control apparatus capable of effectively performing advertisement switching by switching an advertisement screen for a time in which a broadcasting screen is provided, such that a background plane is substantially exposed, and a system including the same.

Technical Solution

In one aspect of the present invention, there is provided a television screen control apparatus including a broadcasting contents data processing unit receiving broadcasting contents information over a channel changed in response to a first channel changing input signal and providing the broadcasting contents information to a first plane, a channel zapping advertisement processing unit providing a channel zapping advertisement to a second plane visually positioned behind the first plane, and a screen mixing unit combining first plane image information and second plane image information, each received from the broadcasting contents data processing unit with each other to provide a mixed output screen. In the mixed output screen, the channel zapping advertisement displayed on the second plane may be exposed from a point in time in which the first channel changing input signal is received to a point in time in which the changed broadcasting contents are provided to the output screen. The first plane may be a video plane, and the second plane may be a background plane.

The channel zapping advertisement processing unit may include a receiver receiving the channel changing input signal and channel zapping advertisement information, a channel zapping advertisement controller generating a channel zapping advertisement matching table based on channel zapping advertisement image data and channel zapping advertisement providing data that are included in the channel zapping advertisement information, and a channel zapping advertisement database storing the channel zapping advertisement information and the channel zapping advertisement matching table therein. The channel zapping advertisement controller may determine whether to change the channel zapping advertisement by comparing a broadcasting channel provided to the mixed output screen to the channel zapping advertisement matching table when a second channel zapping input signal is not received for a predetermined time after the channel zapping response signal is received.

The channel zapping advertisement matching table may match at least one of broadcasting channel information provided to the mixed output screen and a current time period to the channel zapping advertisement.

The channel zapping advertisement controller may manage a time for which the channel zapping advertisement is provided in response to the first channel changing input signal. The channel zapping advertisement controller may generate a channel zapping advertisement providing result based on the time.

The broadcasting contents data processing unit provides application or subtitle information to a third plane visually positioned over the first plane.

The television screen control apparatus may further include a display panel displaying the mixed output screen.

In another aspect of the present invention, there is provided a television screen control system including a channel zapping advertisement server receiving a request for a channel zapping advertisement to be displayed from a first time in which a channel changing input signal is received to a second time in which changed broadcasting contents are provided, and a television screen control apparatus providing a channel zapping advertisement image to a second plane visually positioned behind a first plane which includes broadcasting contents.

The television screen control apparatus may include a broadcasting contents data processing unit changing the broadcasting contents in response to the channel zapping input signal to provide the changed broadcasting contents to the first plane, a channel zapping advertisement processing unit providing the channel zapping advertisement image to the second plane, and a screen mixing unit combining first plane image information and second plane image information, each received from the broadcasting contents data processing unit, with each other to provide a mixed output screen.

The channel zapping advertisement processing unit may include a receiver receiving the channel changing input signal and channel zapping advertisement information, a channel zapping advertisement controller generating a channel zapping advertisement matching table based on channel zapping advertisement image data and channel zapping advertisement providing data that are included in the channel zapping advertisement information, and a channel zapping advertisement database storing the channel zapping advertisement information and the channel zapping advertisement matching table therein. The channel zapping advertisement controller may determine whether to change the channel zapping advertisement by comparing broadcasting channel information provided to the mixed output screen and the channel zapping advertisement matching table when a second channel changing input signal is not received for a predetermined time after the first channel changing input signal is received.

Advantageous Effects

The television screen control apparatus and the system including the same according to an embodiment of the present invention display an advertisement image on a background plane positioned under a general video plane provided in a broadcasting screen to naturally expose the advertisement image for a time in which the broadcasting screen is not provided, such that a point in time of a channel zapping time needs not to be separately detected in order to provide the advertisement image.

Since the television screen control apparatus and the system including the same according to an embodiment of the present invention need not to detect a point in time in which a channel is changed and a point in time in which a broadcasting image of the new channel is resumed in order to provide a channel zapping advertisement, a configuration for providing the channel zapping advertisement may be simply implemented.

Since the television screen control apparatus and the system including the same according to another embodiment of the present invention may change the advertisement image for a time in which the broadcasting screen is provided, such that the advertisement image is not exposed, a time for changing the advertisement image is sufficiently secured, thereby making it possible to stably provide the advertisement image.

DESCRIPTION OF DRAWINGS

The above and other objects, features and advantages of the present invention will be more apparent from the following detailed description taken in conjunction with the accompanying drawings, in which:

FIGS. 8A and 8B are views showing a channel zapping advertisement matching table according to an embodiment of the present invention.

BEST MODE

Figure 1:
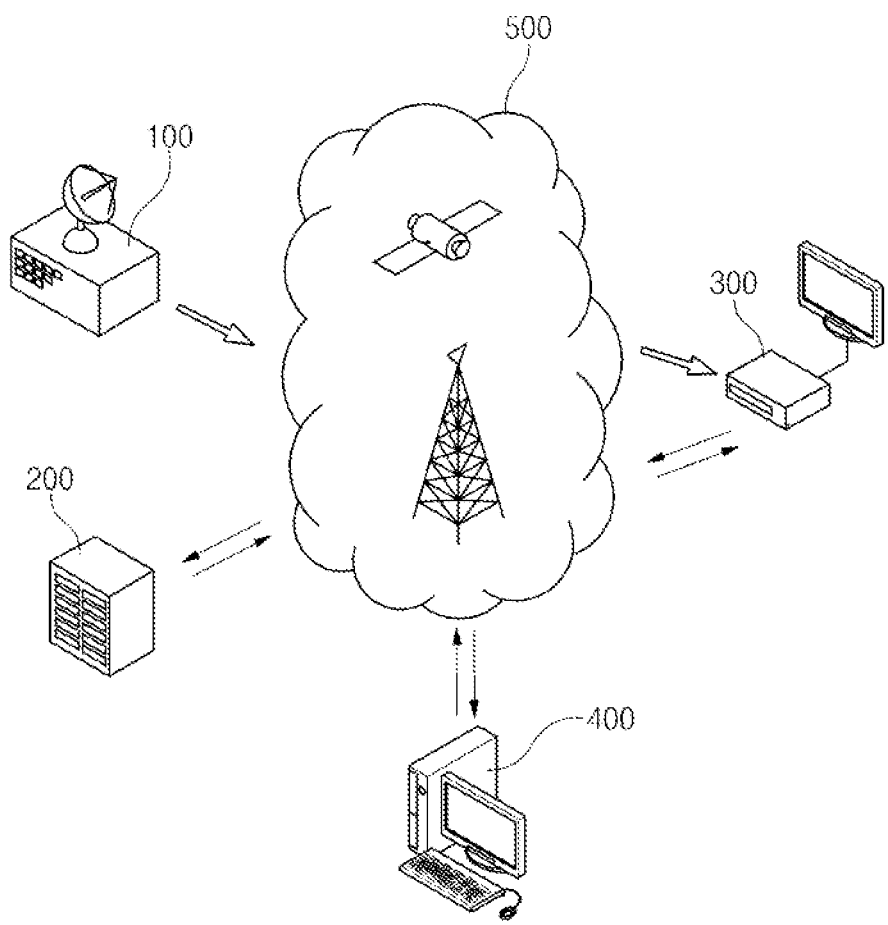
FIG. 1 is a conceptual diagram for describing a digital broadcasting system transmitting an image to a digital type television.

Embodiments of the present invention disclosed in the present specification are only used to describe the present invention. The invention may be implemented in various forms, and is not to be interpreted to be limited to embodiments described in the present specification.

The present invention may be variously modified and have several forms. Therefore, specific embodiments of the present invention will be illustrated in the accompanying drawings and described in detail in the present specification. However, it is to be understood that the present invention is not limited to a specific disclosed form, but includes all modifications, equivalents, and substitutions without departing from the scope and sprit of the present invention.

Terms used in the specification, 'first', 'second', etc. may be used to describe various components, but the components are not to be interpreted to be limited by the terms. These terms may be used to differentiate one component from other components. For example, the 'first' component may be named the 'second' component and the 'second' component may also be similarly named the 'first' component, without departing from the scope of the present invention.

Unless indicated otherwise, it is to be understood that all the terms used in the specification, including technical and scientific terms, have the same meaning as those that are understood by those skilled in the art to which the present invention pertains.

Hereinafter, embodiments of the present invention will be described in more detail with reference to the accompanying drawings. Throughout the accompanying drawings, the same components will be denoted by the same reference numerals, and redundant description thereof may be omitted.

FIG. 1 is a conceptual diagram for describing a digital broadcasting system transmitting an image to a digital television.

Referring to FIG. 1, the digital broadcasting system may include a broadcasting contents providing server 100, a channel zapping advertisement server 200, a television screen control apparatus 300, and an advertiser terminal 400. In addition, a network 500 for communication between the respective components may be configured.

The broadcasting contents providing server 100 provides various types of digital broadcasting contents to the television screen control apparatus 300. The broadcasting content providing server 100 may include a terrestrial broadcasting station, a local cable broadcasting station, an internet protocol television (IPTV) broadcasting station, a satellite broadcasting station, a video on demand (VOD) server, an application server, or the like. The broadcasting contents providing server 100 may transmit broadcasting content to the television screen control apparatus 300 through the network 500 in response to a channel changing request signal received from the television screen control apparatus 300, that is, that a user requests the broadcasting contents providing server 100 to provide specific broadcasting contents.

The channel zapping advertisement server 200 provides a channel zapping advertisement to be exposed for a channel zapping time to the television screen control apparatus 300. The channel zapping advertisement exposed for the channel zapping time may include an advertisement for contents, an enterprise, a product, a service, or the like. The channel zapping advertisement may be provided in a form of a keyword, a graphic image, a moving picture, audio, or the like, and the channel zapping advertisement server 200 may provide more concrete additional information on the advertisement exposed for the channel zapping time. In addition, the channel zapping advertisement server 200 may perform a function of receiving a channel zapping advertisement request from an advertiser, calculating a cost for a channel zapping advertisement, and charging the advertiser an advertisement cost.

The television screen control apparatus 300 receives various types of digital contents from the broadcasting contents providing server 100, displays the received digital contents on a screen, receives the channel zapping advertisement from the channel zapping advertisement server 200, and allows the channel zapping advertisement to be exposed for the channel zapping time.

The television screen control apparatus 300 may include a set top box for receiving terrestrial, satellite, or cable broadcasting, a television in which a set top box function is embedded, an IPTV based on the Internet, or a digital device such as a cellular phone in which a digital multimedia broadcasting (DMB) or digital video broadcasting handheld (DVB-H) receiving module is mounted, a smart phone, a laptop computer, a tablet personal computer (PC), a personal multimedia player (PMP), a navigation device, or the like.

The advertiser terminal 400 is a terminal accessible by the advertiser that provides the channel zapping advertisement, and the advertiser may access the channel zapping advertisement server 200 through the advertiser terminal 400 to request the channel zapping advertisement. The advertiser terminal 400 may determine a channel in which the channel zapping advertisement is provided, a time period in which the channel zapping advertisement is provided, a replacement cycle of the channel zapping advertisement, and the like, and then request the channel zapping advertisement. The advertiser terminal 400 determines above-mentioned details through a channel zapping advertisement request screen provided by the channel zapping advertisement server 200. In an embodiment, the advertiser terminal 400 may include an electronic device capable of performing an Internet connection, such as a personal computer.

The channel zapping advertisement server 200 may map a specific advertisement to a channel, an advertisement providing time period, or the like, based on the channel zapping advertisement request of the advertiser terminal 400 to generate an advertisement providing table. The advertisement providing table may also be transmitted to the television screen control apparatus 300.

The network 500, which is a wired or wireless communication network such as a terrestrial wave, a satellite, a cable, the Internet, or the like, mediates communication between the broadcasting contents providing server 100 and the television screen control apparatus 300, the channel zapping advertisement server 200 and the television screen control apparatus 300, and the channel zapping advertisement server 200 and the advertisement terminal 400. The broadcasting content providing server 100 transmits digital broadcasting contents to the television screen control apparatus 300 through the network 500, the channel zapping advertisement server 200 transmits the channel zapping advertisement to the television screen control apparatus 300 through the network 500, and the advertiser terminal 400 sends a request for the channel zapping advertisement server 200 for the channel zapping advertisement through the network 500.

In an embodiment in which the broadcasting contents providing server 100 transmits the digital broadcasting contents through a terrestrial wave or a satellite, the channel zapping advertisement server 200 may be implemented separately from the broadcasting contents providing server 100 as shown in FIG. 1 to provide the channel zapping advertisement through another communication network such as the Internet. However, in an embodiment in which the broadcasting contents providing server 100 transmits the digital broadcasting contents through the Internet, the channel zapping advertisement server 200 may also be configured integrally with the broadcasting contents providing server 100.

Figure 2:
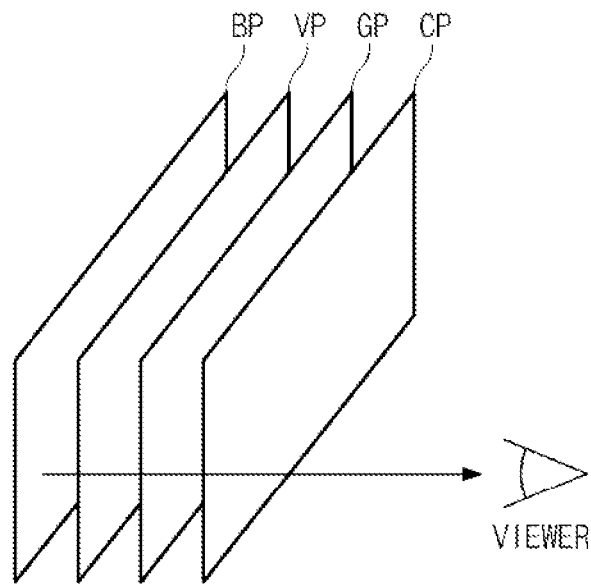
FIG. 2 is a conceptual diagram for describing a display scheme of the digital type television.

FIG. 2 is a conceptual diagram for describing a display scheme of the digital type television.

Referring to FIG. 2, a digital TV may be implemented using a plurality of planes BP, VP, GP, and CP. The respective planes have logically specific functions and vertical layers. That is, in the respective planes, a logically preferentially viewed layer is present, and a viewer views a screen in which all the planes are vertically overlaid.

Relative positions of planes herein are described using vertical terminology. The vertical terminology assumes that a viewer is positioned above the viewing apparatus looking down. For example, as used herein, a lower position is further from a viewer, while an upper position is closer to a viewer.

The background plane BP, which is a plane positioned at the logically lowermost portion, statically displays a decoded video or image. Generally, the background plane BP supports only a specific format such as a moving picture experts group (MPEG)-2 i-frame (defined in ISO/IEC 13818-2) or a joint photographic experts group (JPEG) (defined in ISO/IEC 10918-1).

The video plane VP, which is a plane to which a decoded video is output, is a plane to which broadcasting contents are output. According to an embodiment of the present invention, the digital television may include a plurality of video planes VP, and a plurality of videos may be decoded and then displayed on the respective planes. According to an embodiment of the present invention, a chip supporting a picture-in-picture (PIP) function may display a small screen separately from the present screen in a television screen. In this case, a plurality of videos may be simultaneously decoded and then displayed to the viewer.

The graphics plane GP, which is a plane used by an application or a subtitle, may include at least one graphics plane. In addition, the graphics plane may support various colors and resolutions.

According to an embodiment of the present invention, the digital television may further include a cursor plane CP. In an embodiment, the cursor plane CP, which is a plane used to display a cursor input through hardware on the television screen, may not be provided in a system on chip (SoC) for a general television.

Although certain planes are represented as being positioned at a logically lower portion, when visually viewed, since a plane positioned at a logically upper portion may hide a plane positioned at a logically lower portion, the background plane BP may be represented as being positioned on a rear surface of the video plane VP, the graphics plane GP, and the cursor plane CP. Further, in this case, the cursor plane CP may be represented as being positioned on upper surfaces of other planes BP, VP, and GP.

Figure 3:
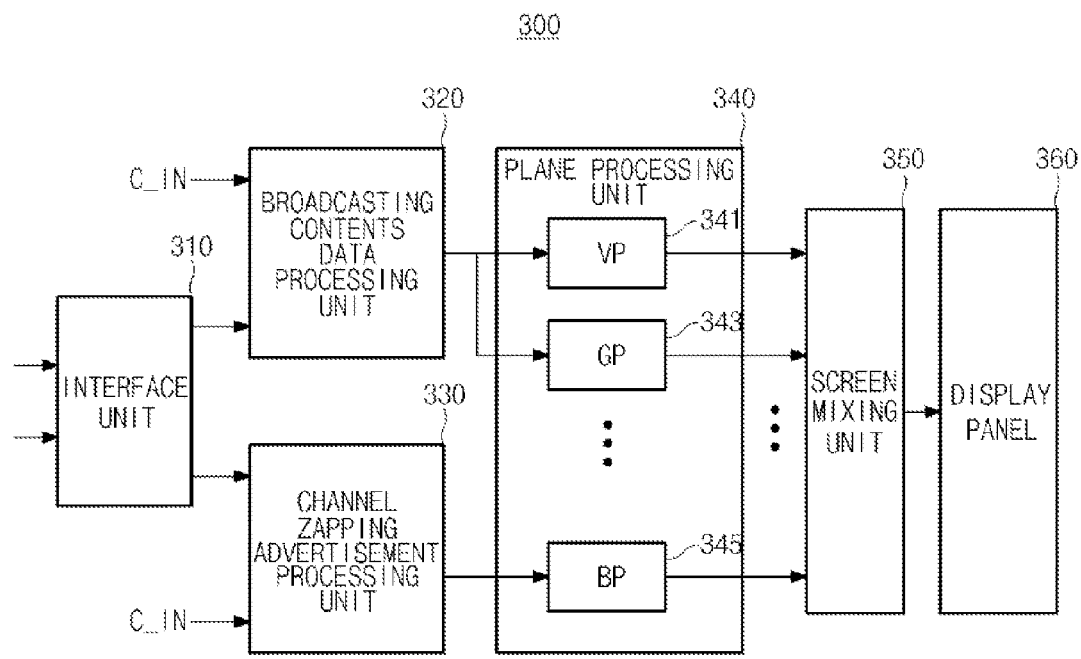
FIG. 3 is a block diagram showing a television screen control apparatus according to an embodiment of the present invention.

FIG. 3 is a block diagram showing a television screen control apparatus according to an embodiment of the present invention.

Referring to FIG. 3, the television screen control apparatus 300 may include an interface unit 310, a broadcasting contents data processing unit 320, a channel zapping advertisement processing unit 330, a plane processing unit 340, and a screen mixing unit 350.

The interface unit 310 may receive channel zapping advertisement information from the channel zapping advertisement server 200 of FIG. 1 and receive broadcasting contents information from the broadcasting contents providing server 100 of FIG. 1. The channel zapping advertisement information may include an image of the channel zapping advertisement itself, an advertiser of the channel zapping advertisement, a broadcasting channel in which the channel zapping advertisement should be provided, an advertisement time period in which the channel zapping advertisement is provided, a valid period of the channel zapping advertisement, and the like. The broadcasting contents information may include a broadcasting contents image, broadcasting contents age limit information, and the like.

The interface unit 310 converts a form of the broadcasting contents information and the channel zapping advertisement information into a form in which they may be processed in the television control apparatus 300 and provides the information having the converted form to the broadcasting contents data processing unit 320 and the channel zapping advertisement processing unit 330, respectively.

The broadcasting content data processing unit 320 may perform an operation such as an operation of decoding the broadcasting contents information to convert a resolution of the broadcasting contents information into a resolution appropriate for displaying the broadcasting contents information, or the like. As described with reference to FIG. 2, since the broadcasting contents are provided on the video plane, the broadcasting contents data processing unit 320 may provide an actual broadcasting contents image to a video plane processor 341 in the plane processing unit 340 so as to be displayed on the video plane In addition, the broadcasting contents data processing unit 320 may provide broadcasting information other than an image such as a subtitle, or the like to a graphics plane processor 343 in the plane processing unit 340.

According to an embodiment of the present invention, the broadcasting contents data processing unit 320 may display the broadcasting contents on the plurality of video planes. Generally, since the broadcasting contents are provided in a stream form in real time, the broadcasting contents data processing unit 320 may decode the broadcasting contents in real time, associate the broadcasting contents with the planes, and provide the broadcasting contents to the plane processing unit 340.

In addition, the broadcasting data processing unit 320 may receive a channel changing input signal C_IN to receive broadcasting contents information of a new channel rather than currently received broadcasting contents. In response to the channel changing input signal C_IN, the broadcasting contents data processing unit 320 request the broadcasting contents providing server 100 for the broadcasting contents information of the new channel through the interface unit 310, and the broadcasting contents providing server 100 receives the request and provides the broadcasting contents information of the new channel. A channel zapping time may occur due to the time it takes to transmit, receive, decode, and otherwise process data to be displayed on a display screen regarding the new channel. As described above, a channel zapping time occurs from a point in time in which a channel changing input signal C_IN is input to a point in time in which the broadcasting contents of the new channel are provided.

Since no information is provided on the video plane for the channel zapping time, a black or empty screen may be provided through the video plane. Therefore, the channel zapping advertisement may be provided for the channel zapping time. However, several seconds or more may be required to detect the point in time in which the channel changing input signal C_IN is input and to display the channel zapping advertisement on a specific plane, in order to provide the channel zapping advertisement. Furthermore, since the channel zapping advertisement may not be visible concurrently with broadcasting contents, a point in time in which the broadcasting contents of the new channel start to be provided, for example, a point in time in which an i-frame of a broadcasting contents image of the new channel is provided should be detected to stop the display of the channel zapping advertisement. However, in the case of detecting a start point and an end point of the channel zapping time and displaying the channel zapping advertisement in response to the start point and the end point, the channel zapping advertisement may not be provided in time and an excessive amount of operations may be required. In other words, it may be difficult to serve an advertisement from a remote server on-the-fly in response to a channel changing input signal C_IN.

Therefore, in the television screen control apparatus 300 according to an embodiment of the present invention, the channel zapping advertisement processing unit 330 receives the channel zapping advertisement information in advance and displays a channel zapping advertisement image on the background plane in advance. As described with reference to FIG. 2, since the background plane BP is hidden for a period in which the broadcasting contents are provided on the video plane VP, even though the channel zapping advertisement is displayed in advance, it does not have an effect on providing the broadcasting contents at all.

Although names of the respective planes have been used in order to implement the digital television and the case in which the channel zapping advertisement is displayed on the background plane BP positioned at the logically lowermost surface among the respective planes has been described in the present specification, the channel zapping advertisement is not limited to being displayed on the background plane BP, but may also be displayed on a plane positioned at the lowermost portion among the plurality of planes implementing digital television. For example, a television screen control apparatus and control system according to an embodiment of the present invention may also use a scheme of separately implementing a channel zapping advertisement plane at a logically lower portion than the background plane BP to provide the channel zapping advertisement.

Further, since the plurality of planes may be variously implemented in the digital television, a television screen control apparatus and control system according to an embodiment of the present invention may use all of the schemes of displaying the channel zapping advertisement on a plane positioned at a logically lower portion, that is, a lower surface, of the video plane VP on which the broadcasting advertisement is displayed.

The channel zapping advertisement processing unit 330 receives channel zapping advertisement information from the channel zapping advertisement server 200 to provide the channel zapping advertisement image to the background plane processor 345 of the plane processing unit 340. As a result, since the channel zapping advertisement is displayed on the background plane in a state in which the viewer views a specific channel, the particular channel zapping advertisement may be determined according to a channel that is currently being viewed by the viewer, that is, a channel corresponding to the broadcasting contents that are being displayed on the video plane. According to an embodiment of the present invention, the channel zapping advertisement displayed on the background plane may be determined in several schemes.

The channel zapping advertisement processing unit 330 may communicate with the channel zapping advertisement server 200 for a predetermined time interval to update the channel zapping advertisement information. For example, the predetermined time interval may be one minute.

The plane processing unit 340 processes information received from the broadcasting contents data processing unit 320 and the channel zapping advertisement processing unit 330 so that the information corresponds to particular planes and provides images of the particular planes to the screen mixing unit 350.

The screen mixing unit 350 provides an output screen in which all planes are mixed with one another based on a layer of the respective planes.

According to an embodiment of the present invention, the television screen control apparatus 300 may further include a display panel 360. The display panel 360 may have an input/output function and include a flat panel using a liquid crystal display (LCD), a plasma display panel (PDP), an organic light emitting diode (OLED), a field emission display (FED), or the like.

The display panel 360 may be implemented outside the interface unit 310, the broadcasting contents data processing unit 320, the channel zapping advertisement processing unit 330, the plane processing unit 340, and the screen mixing unit 350, or be implemented integrally with the interface unit 310, the broadcasting contents data processing unit 320, the channel zapping advertisement processing unit 330, the plane processing unit 340, and the screen mixing unit 350.

Figure 4:
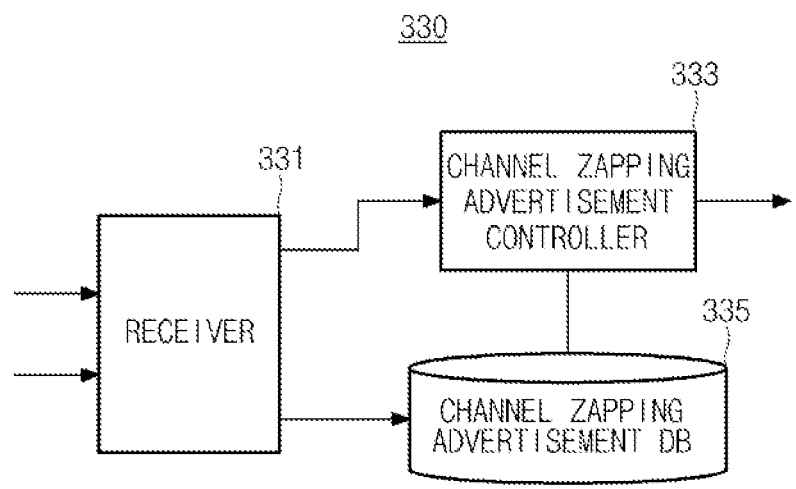
FIG. 4 is a block diagram showing a channel zapping advertisement processing unit according to an embodiment of the present invention.

FIG. 4 is a block diagram showing a channel zapping advertisement processing unit according to an embodiment of the present invention.

Referring to FIG. 4, the channel zapping advertisement processing unit 330 may include a receiver 331, a channel zapping advertisement controller 333, and a channel zapping advertisement database 335.

The receiver 331 may receive the channel changing input signal C_IN and channel zapping advertisement information.

The channel zapping advertisement controller 333 may generate a channel zapping advertisement matching table based on channel zapping advertisement image data and channel zapping advertisement providing data that are included in the channel zapping advertisement information.

The channel zapping advertisement providing data may include the identity of an advertiser of the channel zapping advertisement, a broadcasting channel in which the channel zapping advertisement should be provided, an advertisement time period in which the channel zapping advertisement is provided, a valid period of the channel zapping advertisement, and the like, as described above. The channel zapping advertisement controller 333 may provide the received channel zapping advertisement information to the channel zapping advertisement database 335 to allow the channel zapping advertisement information to be stored in the channel zapping advertisement database 335. The channel zapping advertisement controller may retrieve a certain information from the channel zapping advertisement database 335 and process the retrieved information.

The channel zapping advertisement controller 333 allows the background plane processor 345 of the plane processing unit 340 to display a channel zapping advertisement image based on channel zapping advertisement data and changes the channel zapping advertisement if necessary. The change of the channel zapping advertisement may be performed based on the channel zapping advertisement matching table, and the change of the channel zapping advertisement and the channel zapping advertisement matching table will be described below with reference to FIGS. 6D to 8B.

In addition, the channel zapping advertisement controller 333 may recognize a time in which the channel zapping advertisement is actually exposed to manage a channel zapping advertisement providing result. According to an embodiment of the present invention, in the case in which the channel changing input signal is provided in a state in which a specific channel zapping advertisement is displayed and the channel changing (zapping) is executed, the controller may recognize that the channel zapping advertisement displayed on the background plane is visible to the viewer. Therefore, the channel zapping advertisement controller 333 may manage a time in which each channel zapping advertisement is exposed to generate a channel zapping advertisement providing result, and use the channel zapping advertisement providing result when it calculates an advertisement cost.

The channel zapping advertisement database 335 may store the channel zapping advertisement information and the channel zapping advertisement matching table therein.

Figure 5:
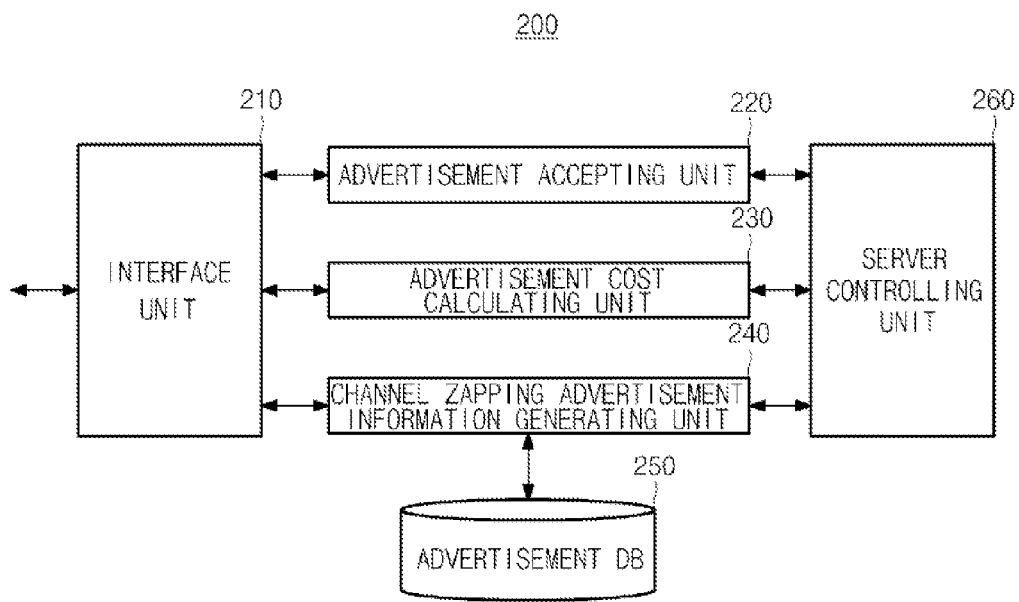
FIG. 5 is a block diagram showing an example of a channel zapping advertisement server according to an embodiment of the present invention.

FIG. 5 is a block diagram showing an example of a channel zapping advertisement server 200 of FIG. 1.

In an embodiment in which the television screen control system is configured to include the channel zapping advertisement server 200 and the television screen control apparatus 300 will now be described.

The channel zapping advertisement server 200 receives a request for a channel zapping advertisement from the advertiser terminal 400, generates channel zapping advertisement information, and provides the channel zapping advertisement information to the television screen control apparatus 300.

Referring to FIG. 5, the channel zapping advertisement server 200 may include an interface unit 210, an advertisement accepting unit 220, an advertisement cost calculating unit 230, a channel zapping advertisement information generating unit 240, a server controlling unit 260, and an advertisement database 250.

The interface unit 210 may convert a form of information received from the advertiser terminal 400 or the television screen control apparatus 300 into a form appropriate for the channel zapping advertisement server 200. The interface unit 210 may convert to a form of information appropriate for the advertiser terminal 400 or the television screen control apparatus 300, and then provide the information to the advertiser terminal 400 or the television screen control apparatus.

The advertisement accepting unit 220 accepts a request for the channel zapping advertisement from the advertiser terminal 400. The request for the channel zapping advertisement may include information such as a broadcasting channel, a time period, a region, and the like, in which the channel zapping advertisement should be provided. The information accepted through the advertisement accepting unit 220 may be provided to the channel zapping advertisement information generating unit 240 to thereby become a basis for generating the channel zapping advertisement information.

The advertisement cost calculating unit 230 may calculate an advertisement cost based on the channel zapping advertisement providing result provided from the television screen control apparatus 300 and charge the advertiser terminal 400 for the advertisement cost. The advertisement cost may be calculated based on a cost per an exposure of the channel zapping advertisement. Alternatively, the advertisement cost may be calculated by adding a basic cost and an additional cost. In an embodiment, the basic cost may be determined based on a predetermined exposure number of the advertisement that may correspond to a minimum cost for a certain advertisement, and the additional cost may be determined based on a number of exposures that exceeds the predetermined exposure number.

The advertisement database 250 stores the channel zapping advertisement information therein. Although the channel zapping advertisement database 335 stores the channel zapping advertisement image therein, the channel zapping advertisement database 335 may have a limited storage capacity, so information may be stored in the advertisement database 250.

The server controlling unit 260 controls general operations of the channel zapping advertisement server 200, and may include a processor.

FIGS. 6A to 6D are conceptual diagrams showing an output screen provided according to the television screen control apparatus and a television screen control system according to an embodiment of the present invention.

Figure 6A:
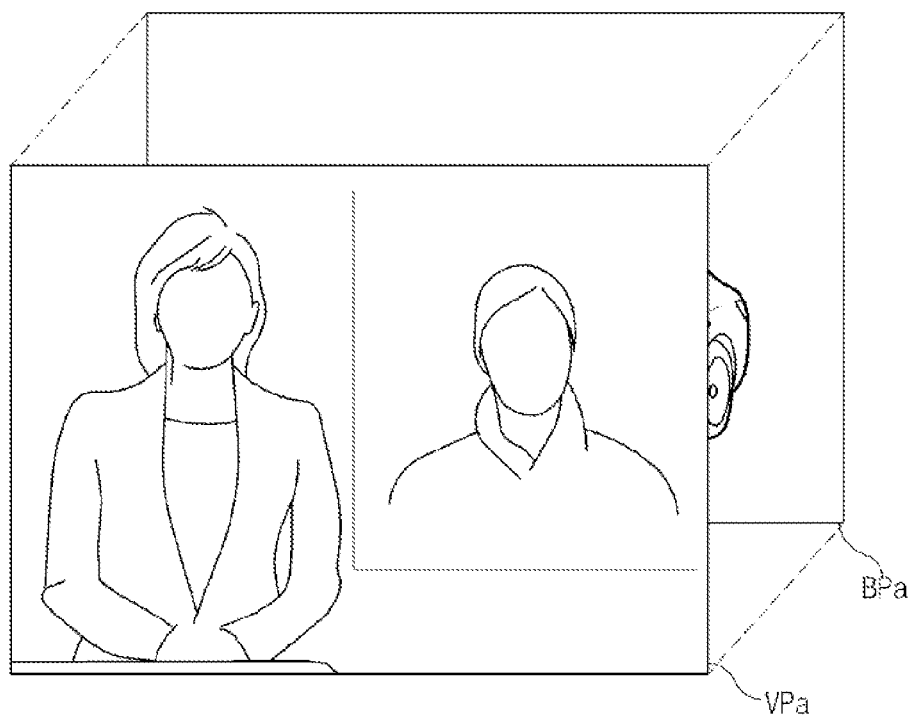
FIGS. 6A to 6D are conceptual diagrams showing an output screen according to the television screen control apparatus and a television screen control system according to an embodiment of the present invention.

FIG. 6A is a diagram showing a general viewing situation in which broadcasting contents are provided on a video plane VPa in a state in which the channel zapping advertisement is displayed on a background plane BPa.

Referring to FIG. 6A, since the broadcasting contents are provided on the video plane VPa, the channel zapping advertisement displayed on the background plane BPa is not exposed, and it visually seems as if only the broadcasting contents are provided on the video plane VPa.

Figure 6B:
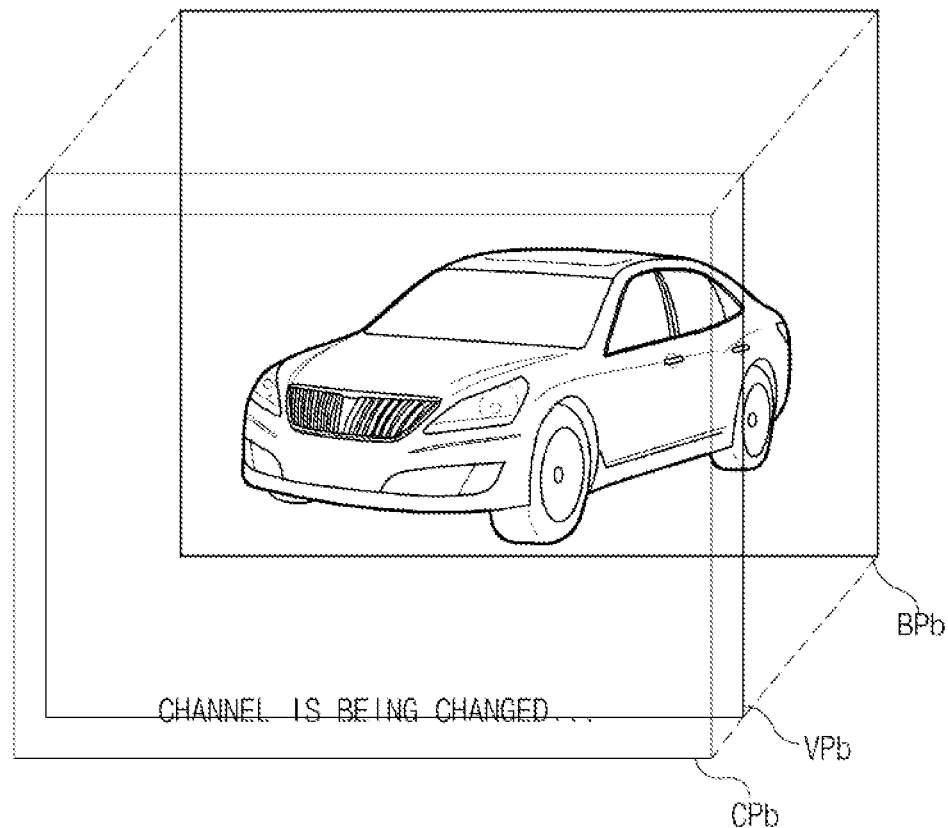

FIG. 6B is a diagram showing a process of requesting broadcasting contents information of a new channel and receiving and processing the broadcasting contents information of the new channel without receiving broadcasting contents information previously provided on the video plane VPa in response to a channel changing input signal.

Referring to FIG. 6B, since there is no information to be displayed on the video plane VPb, visually, the video plane VPb is penetrated and the background plane BPb is exposed. Therefore, the channel zapping advertisement on the background plane BPa of FIG. 6A is exposed.

Although the channel zapping advertisement displayed on the background plane BPb has already been presented to the screen during the previous broadcast, it may visually seem that the channel zapping advertisement is newly displayed on the screen.

According to an embodiment of the present invention, guide information indicating that the channel is currently being changed may also be displayed on a cursor plane CPb, or the like, positioned over the video plane BPb.

Figure 6C:
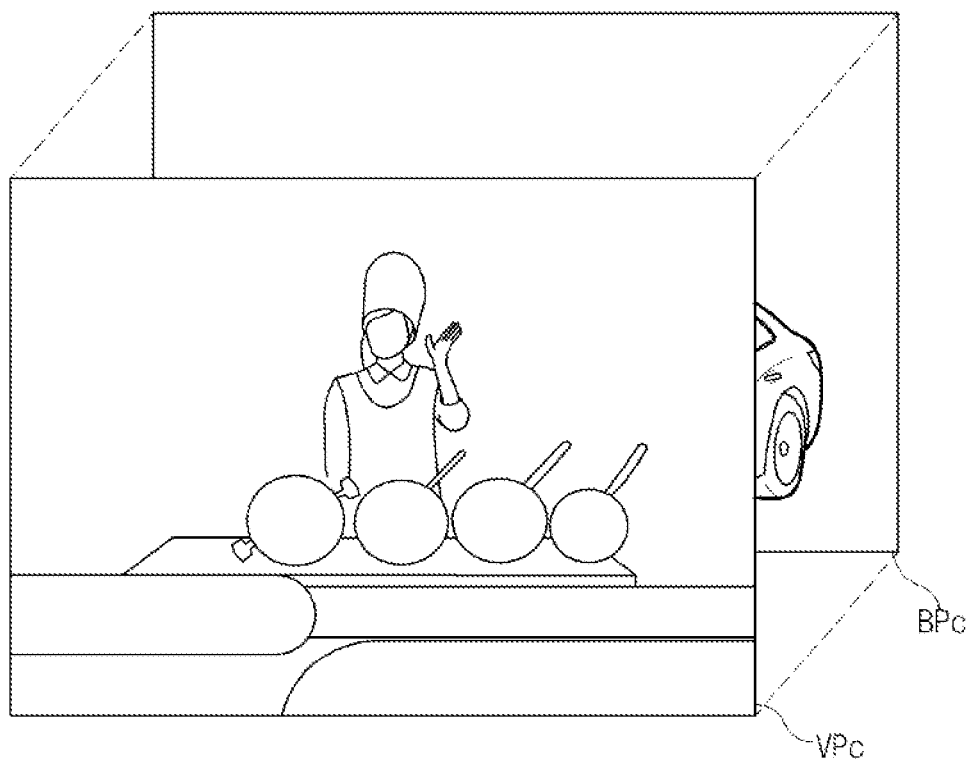

FIG. 6C is a diagram showing an embodiment in which the broadcasting contents of the new channel are received and processed and are displayed on a video plane VPc, in response to a channel changing input signal.

When the broadcasting contents of the new channel are provided, it hides the channel zapping advertisement of the background plane BPc, similar to the case of FIG. 6A.

Referring to FIGS. 6A to 6C, although the channel zapping advertisement is displayed on the background planes BPa, BPb, and BPc as it is, since the video planes VPa, VPb, and VPc are changed, there is a visual effect as if the channel zapping advertisement appears and then disappears. However, since no processing is performed on the background plane for a channel zapping time, the television screen control apparatus and the system including the same according to an embodiment of the present invention may provide the channel zapping advertisement without detecting the channel zapping time and provide the channel zapping advertisement without hindering the broadcasting contents.

Figure 6D:
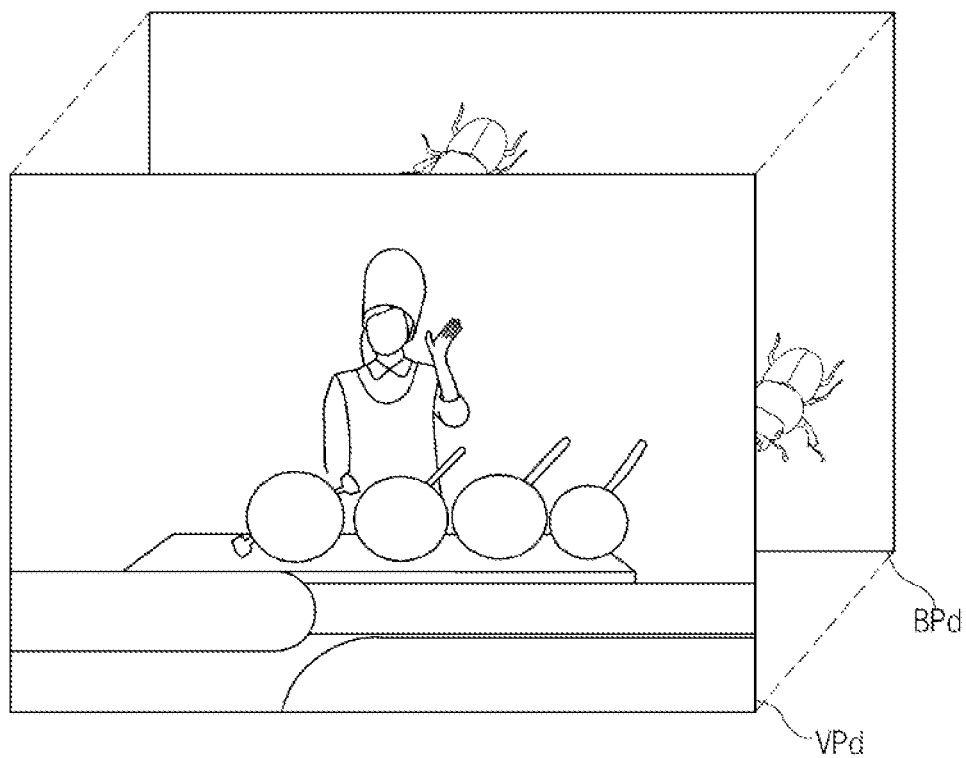

FIG. 6D is a diagram showing an embodiment in which the channel zapping advertisement is changed based on information related to the concurrently broadcasted channel, after the channel is changed in response to the channel changing input signal and thus the new channel is presented in the video plane.

When the channel is changed according to the channel changing input signal and the viewer views another channel, characteristics of the broadcasting contents that have been previously provided are changed. For example, when a channel zapping advertisement targeting viewers that are viewing news is provided in FIG. 6A and a channel zapping advertisement targeting viewers that are viewing a home shopping channel is provided in FIG. 6C, an advertisement effect may be maximized.

Therefore, the television screen control apparatus and the system including the same according to an embodiment of the present invention do not change the channel zapping advertisement for the channel zapping time, but may change the channel zapping advertisement for a period in which the broadcasting contents are being provided on the video plane. In other words, advertisements may be changed while normal broadcasting contents are being viewed.

The channel zapping advertisement controller 333 of FIG. 4 may determine whether the channel changing input signal C_IN is again input for a predetermined time after an initial input of channel changing input signal C_IN. After the channel changing input signal C_IN is input, when a first time (for example, two seconds) elapses, the broadcasting contents of the new channel may be provided. In addition, when the channel changing input signal C_IN is not again input until a second time (for example, ten seconds) elapses, it may be determined that the channel has been changed and the new channel has been viewed. Therefore, the channel zapping advertisement controller 333 may identify a channel zapping advertisement matched to a channel corresponding to broadcasting contents that are currently being provided on the video plane when the channel changing input signal C_IN is not again input for a predetermined time corresponding to the sum of the first and second times.

That is, the channel zapping advertisement controller 333 determines whether the channel zapping advertisement matched to the channel that is currently being viewed by the viewer is being provided, requests the channel zapping advertisement server 200 to change the channel zapping advertisement or receives the channel zapping advertisement image from the channel zapping advertisement database 355 in the case in which the channel zapping advertisement is changed, and provides the changed channel zapping advertisement image data to the background plane processor 345 of the plane processing unit 340 to change the channel zapping advertisement.

Since the broadcasting contents are provided on a video plane VPd, a change of the channel zapping advertisement is not visible to a viewer. However, subsequently, when the channel is changed in response to the channel changing input signal, the changed channel zapping advertisement is exposed.

Figure 7:
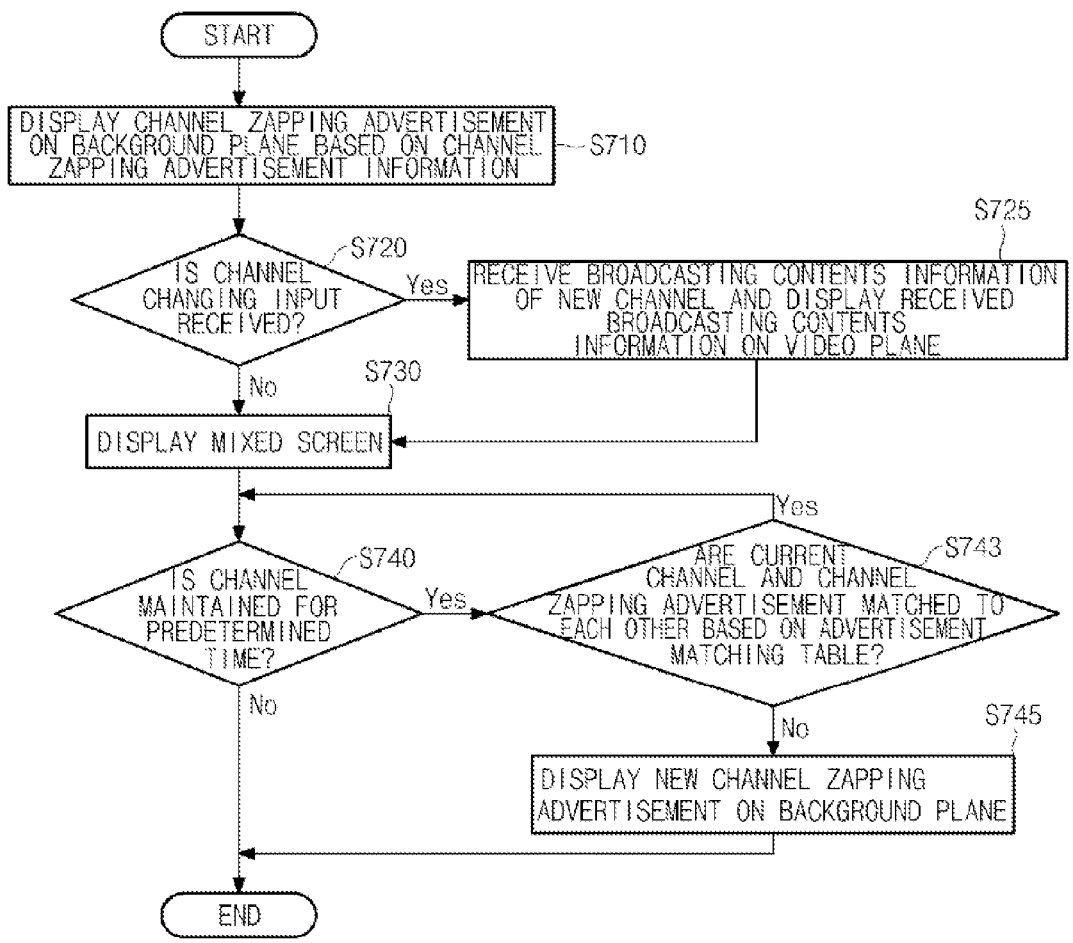
FIG. 7 is a flow chart showing a television screen control method according to an embodiment of the present invention.

FIG. 7 is a flow chart showing a television screen control method according to an embodiment of the present invention.

Referring to FIG. 7, the channel zapping advertisement is displayed on the background plane based on the channel zapping advertisement information (S710). Since the television screen control apparatus and the system including the same according to an embodiment of the present invention display the channel zapping advertisement on the background plane in advance for a period in which the broadcasting contents are provided, the channel zapping advertisement may be provided without a delay time as compared with a case in which the channel zapping advertisement is provided in response to the channel changing input signal.

Then, in the case in which the channel changing input signal is received (S720, YES), the broadcasting contents information of the new channel is received and displayed on the video plan (S725). A period in which the corresponding step is performed may correspond to the channel zapping time. In such an embodiment, the channel zapping advertisement displayed in S710 is exposed without displaying any information on the video plane.

A mixed screen including both video plane VP and background plane BP is displayed according to the broadcasting contents information of the new channel (S730). This mixed screen may be continuously displayed even though the channel is not changed.

In the case in which the viewing for the channel is maintained for a predetermined time (S740, YES), it is determined whether a current channel and a channel zapping advertisement are matched to each other based on the channel zapping advertisement matching table (S743). The predetermined time may correspond to the sum of first and second times elapsing after the channel changing input signal is input.

In the case in which the channel zapping advertisement displayed on the background plane does not correspond to with the channel that is currently being viewed, a channel zapping advertisement matched to the channel that is currently being viewed is displayed on the background plane (S745).

At the time of the next channel changing, the changed channel zapping advertisement is exposed.

In the case in which the channel zapping advertisement displayed on the background plane is matched to the channel that is currently being viewed, there is no need to change the channel zapping advertisement.

FIGS. 8A and 8B are views showing a channel zapping advertisement matching table according to an embodiment of the present invention.

The channel zapping advertisement matching table may be generated by the channel zapping advertisement controller 333 based on the channel zapping advertisement information received from the channel zapping advertisement processing unit 330. Since the channel zapping advertisement information may be changed by the channel zapping advertisement server 200 itself or through an external input of the advertiser terminal 400, the channel zapping advertisement processing unit 330 may update the channel zapping advertisement matching table at a predetermined interval.

Referring to FIG. 8A, broadcasting channels and channel zapping advertisements are matched to each other. That is, in the case in which the channel zapping advertisement is matched to the channel that is currently being viewed, when the channel is changed, the channel zapping advertisement that is displayed on the background plane in advance at the time of being previously viewed is exposed.

For example, a channel zapping advertisement of H motor group is displayed on the background plane for a period in which SBS (Seoul Broadcasting System) is viewed. In the case in which the viewer changes a channel to MBC (Munhwa Broadcasting Corporation), the channel zapping advertisement of H motor group is exposed, and in the case in which MBC is viewed without inputting a channel changing input signal for a predetermined time after a channel changing input signal to MBC is input, the channel zapping advertisement controller 333 determines whether or not the advertisement of H motor group currently displayed on the background plane is matched with the current channel, that is MBC.

Since the channel zapping advertisement displayed on the background plane is not the channel zapping advertisement matched to the channel of the broadcasting contents currently displayed on the video, the channel zapping advertisement controller 333 provides the channel zapping advertisement of L mobile operating company to the background plane, thereby changing the channel zapping advertisement.

On the other hand, in the case in which the advertisement of H motor group is matched to MBC, the channel zapping advertisement is not changed.

In an embodiment, the channel zapping advertisement matching table may also be generated to have particular elements for each broadcasting time period as well as each broadcasting channel that is currently being viewed.

Referring to FIG. 8B, different channel zapping advertisements may be matched to broadcasting channels and broadcasting time periods. In this case, when the time period is changed, the channel zapping advertisement may be changed without responding to the channel changing input signal.

For example, in the case in which broadcasting contents information of KBS1 (Korean Broadcasting System 1) is displayed on the video plane before 13:00, a channel zapping advertisement of S clothing is displayed on the background plane. Even in the case in which the channel changing input signal is not provided after 13:00, such that the broadcasting contents of KBS is continuously being displayed on the video plane, the channel zapping advertisement controller 333 determines the time period to provide a channel zapping advertisement of N snack to be displayed on the background plane.

Therefore, channel advertisement information appropriate for viewers of a specific channel and more appropriate for viewers sub-divided for each time period in which they view broadcasting contents may be provided.

A television screen control apparatus according to an embodiment of the present invention displays the channel zapping advertisement on the background plane that is not viewed for a period in which the broadcasting contents are provided, thereby making it possible to naturally expose the channel zapping advertisement for the channel zapping time and not to have an effect on providing the broadcasting contents of the new channel. Therefore, the channel zapping advertisement may be simply and effectively provided.

In addition, since a television screen control system according to an embodiment of the present invention may change the channel zapping advertisement displayed on the background plane for the period in which the broadcasting contents are provided, a process of changing the channel zapping advertisement is not visually exposed, such that a delay time such that the black or blank screen caused by changing the channel zapping advertisement is not generated.

It will be obvious to those skilled in the art to which the present invention pertains that the present invention described above is not limited to the above-mentioned embodiments and the accompanying drawings, but may be variously substituted, modified, and altered without departing from the scope and spirit of the present invention.

INDUSTRIAL APPLICABILITY

The television screen control apparatus and the system including the same according to an embodiment of the present invention may be used in an industrial field for transmitting broadcasting and advertisement images using an apparatus for controlling a television screen.

The invention claimed is:

1. A television screen control apparatus comprising:
a broadcasting contents data processing unit configured to receive new broadcasting contents when a channel is changed in response to a first channel changing input signal, to provide currently received broadcasting contents to a first plane, and to provide the new broadcasting contents to the first plane in response to the first channel changing input signal;
a channel changing advertisement processing unit configured to provide a channel zapping advertisement to a second plane visually positioned behind the first plane, wherein a size of the second plane is substantially the same as a size of the first plane, the second plane being hidden by the first plane when currently received broadcasting contents or new broadcasting contents are provided to the first plane, the second plane being displayed only after the first channel changing input signal and before the new broadcasting contents are provided; and
a screen mixing unit configured to combine first plane image information and second plane image information, each received from the broadcasting contents data processing unit, with each other to provide a mixed output screen,
wherein the channel changing advertisement processing unit includes:
a receiver configured to receive the channel changing input signal and channel zapping advertisement information;
a channel zapping advertisement controller configured to generate a channel zapping advertisement matching table based on channel zapping advertisement image data and channel zapping advertisement providing data that are included in the channel zapping advertisement information; and
a channel zapping advertisement database configured to store the channel zapping advertisement information and the channel zapping advertisement matching table therein, and
wherein the channel zapping advertisement controller determines whether to change the channel zapping advertisement by comparing a broadcasting channel provided to the mixed output screen to the channel zapping advertisement matching table when a second channel changing input signal is not received for a predetermined time after the first channel changing input signal is received.

2. The television screen control apparatus according to claim 1, wherein the channel zapping advertisement displayed on the second plane is exposed from a point in time in which the first channel changing input signal is received to a point in time in which the new broadcasting contents are provided to the first plane.

3. The television screen control apparatus according to claim 1, wherein the channel zapping advertisement matching table matches at least one of broadcasting channel information provided to the mixed output screen and a current time period to the channel zapping advertisement.

4. The television screen control apparatus according to claim 1, wherein the channel zapping advertisement controller manages a time for which the channel zapping advertisement is provided in response to the first channel changing input signal, and the channel zapping advertisement controller generates a channel zapping advertisement providing result based on the time.

5. The television screen control apparatus according to claim 2, wherein the broadcasting contents data processing unit provides application or subtitle information to a third plane visually positioned over the first plane.

6. The television screen control apparatus according to claim 1, further comprising a display panel configured to display the mixed output screen.

7. The television screen control apparatus according to claim 1, wherein the first plane is a video plane, and the second plane is a background plane.

8. A television screen control system comprising:
a channel zapping advertisement server configured to receive a request for a channel zapping advertisement to be displayed from a first time in which a first channel changing input signal is received to a second time in which changed broadcasting contents are provided; and
a television screen control apparatus configured to provide a channel zapping advertisement image to a second plane visually positioned behind a first plane which includes broadcasting contents, a size of the second plane being substantially the same as a size of the first plane, the second plane only being displayed after the first time and before the second time, the second plane being hidden by the first plane when the broadcasting contents are provided to the first plane,
wherein the television screen control apparatus includes:
a broadcasting contents data processing unit configured to change the broadcasting contents in response to the first channel changing input signal to provide the changed broadcasting contents to the first plane,
a channel zapping advertisement processing unit configured to provide the channel zapping advertisement image to the second plane, and
a screen mixing unit configured to combine first plane image information and second plane image information, each received from the broadcasting contents data processing unit, with each other to provide a mixed output screen,
wherein the channel zapping advertisement processing unit includes:
a receiver configured to receive the first channel changing input signal and channel zapping advertisement information,
a channel zapping advertisement controller configured to generate a channel zapping advertisement matching table based on channel zapping advertisement image data and channel zapping advertisement providing data that are included in the channel zapping advertisement information, and
a channel zapping advertisement database configured to store the channel zapping advertisement information and the channel zapping advertisement matching table therein, and
wherein the channel zapping advertisement controller determines whether to change the channel zapping advertisement by comparing broadcasting channel information provided to the mixed output screen and the channel zapping advertisement matching table when a second channel changing input signal is not received for a predetermined time after the first channel changing input signal is received.

9. The television screen control system according to claim 8, wherein the first plane is a video plane, and the second plane is a background plane.

10. The television screen control system according to claim 8, wherein the channel zapping advertisement matching table matches at least one of broadcasting channel information provided to the mixed output screen and a current time period to the channel zapping advertisement.

11. The television screen control system according to claim 8, wherein the channel zapping advertisement controller manages a time in which the channel zapping advertisement is provided for each channel zapping advertisement in response to the first channel changing input signal.

12. The television screen control system according to claim 11, wherein the channel zapping advertisement server
   is configured to accept a channel zapping advertisement request from an external advertiser server; and
   calculate a cost to be imposed on the advertiser server based on the time in which the channel zapping advertisement is provided.

13. A method, comprising:
   displaying first broadcasting contents on a first plane of a television screen;
   providing a zapping advertisement image to a second plane of the television screen, the second plane being underneath the first plane;
   exposing the zapping advertisement image of the second plane after a channel changing input is received and during a channel zapping time;
   displaying second broadcasting contents corresponding to the channel changing input on the front plane when the channel zapping time has elapsed; and
   determining whether to change the channel zapping advertisement image by comparing broadcasting channel information and a channel zapping advertisement matching table when a second channel changing input signal is not received for a predetermined time after the first channel changing input signal is received,
   wherein the zapping advertisement image is hidden when the first and second broadcasting contents are displayed.

14. The method of claim 13, wherein the zapping advertisement image is provided to the second plane before the channel changing input is received.

* * * * *